United States Patent [19]

Tünker

[11] Patent Number: 4,929,493

[45] Date of Patent: May 29, 1990

[54] METHOD OF APPLYING A COLORATION COATING TO A GLASS PANE

[75] Inventor: Gerhard Tünker, Duisburg, Fed. Rep. of Germany

[73] Assignee: Flachglas Aktiengesellschaft, Furth, Fed. Rep. of Germany

[21] Appl. No.: 222,473

[22] Filed: Jul. 21, 1988

[30] Foreign Application Priority Data

Jul. 21, 1987 [DE] Fed. Rep. of Germany ....... 3724013

[51] Int. Cl.$^5$ .............................................. B32B 3/00
[52] U.S. Cl. ................................... 428/207; 427/108; 427/165; 427/282; 427/287; 427/376.2; 428/208; 428/210; 428/428; 428/432; 428/689; 428/647; 428/698; 428/701
[58] Field of Search ............ 427/108, 165, 282, 376.2, 427/287, 226, 229; 428/207, 208, 210, 428, 432, 689, 697, 698, 701

[56] References Cited

U.S. PATENT DOCUMENTS

| | | | |
|---|---|---|---|
| 3,607,349 | 9/1971 | Dereich | 427/282 |
| 4,300,934 | 11/1981 | Detorre | 427/282 |
| 4,435,219 | 3/1984 | Greigger | 106/287.12 |
| 4,595,606 | 6/1986 | St. John | 427/282 |
| 4,620,994 | 11/1986 | Suss et al. | 427/407.1 |
| 4,746,568 | 5/1988 | Matsumoto et al. | 427/270 |

*Primary Examiner*—Janyce Bell
*Attorney, Agent, or Firm*—Herbert Dubno

[57] ABSTRACT

A coating which does not reduce the strength of a glass pane and consists of an aluminum phosphate binder in combination with a flake or platelet inorganic pigment is screen-printed on the glass and burned into the latter. The coating can be made conductive by incorporating graphite and/or carbon black therein.

13 Claims, No Drawings

METHOD OF APPLYING A COLORATION COATING TO A GLASS PANE

FIELD OF THE INVENTION

My present invention relates to a method of applying a coating to a surface of a glass pane and, more particularly, to a process for applying a colored, coloring or coloration-imparting coating to the surface of a glass pane and especially a windshield or other automotive glass pane.

BACKGROUND OF THE INVENTION

The application of coatings to glass panes is of advantage for a variety of purposes. For example, the coating can block partially or entirely the passage of light through a glass pane or a portion thereof, or can impart a color to the glass pane for decorative, aesthetic or functional purposes. The coating may be conductive to allow it to be used, for example, in conjunction with a defroster or window-heating unit.

Coatings have been applied from coating compositions which have a pasty to flowable consistency, utilizing screening techniques, especially silk-screening, followed by heating of the glass pane provided with the coating to bond the coating to the glass.

When the term "color" to "coloration" is used herein, it will be understood to mean also black or opaque coatings.

A particularly advantageous application of such a coating is the application of a frame-like opaque coating along the edge of an automotive vehicle windshield, especially when the windshield is to be attached in the vehicle body by the direct-bonding technique i.e. without a distinct frame.

The heat treatment which is effected causes a burning of the coating material into the glass and it is generally desirable to carry out the burning of the coating into the glass in conjunction with another heat treatment to which the glass may be subject, e.g. a bending operation or a prestressing process.

In the past, the coating compositions applied to the glass have generally contained a significant quantity of a glass frit which can be replaced by glass-forming components in the composition.

The coating which results after burning thus has a solid glass-like character.

For reasons which are not clear to date, the ultimate strength of the coated composite is greatly reduced as a result of the coating operation. Indeed, the tensile strength or resistance to rupture as well as the compressive strength of the glass pane drops sharply in the region of the coating to be about ⅓ of its original value.

This problem has been recognized in the past and it is known from German Pat. Document No. DE 34 33 408, for example, to operate with certain glass frits and special glass matrixes and to hold the linear coefficient of thermal expansion of the glass matrix in the temperature range of 20°–300° C. below the linear coefficient of thermal expansion of the glass pane. Subscribing to these conditions has been found to be expensive and it has not always been possible to adjust the conditions with the precision required of them, so that the results have not always been satisfactory.

OBJECTS OF THE INVENTION

It is the principal object of the invention to provide a process for the coating of glass panes such that these drawbacks can be avoided.

Another object of the invention is to provide an improved method of coating glass panes so that the coated product will not suffer the significant reduction in ultimate strength in the region of the coating which has been recognized as a problem with earlier coating methods.

It is also an object of the invention to provide a method of coating glass panes in which the coating will have the ability to withstand all of the stresses to which such coatings may be subject, whether the coating is conductive or nonconductive, especially where the coating is applied in an automotive vehicle windshield.

Especially, the coating must be adherent to the glass pane if to be practically permanent. It must be scratch resistant and have a high corrosion resistance. It must satisfy all requirements for the use to which it may be put, including use in safety glass panes.

SUMMARY OF THE INVENTION

We have found that these objects can be obtained by forming the coating composition with flake-like or platelet-form inorganic pigments with a particle size of less than about 40 $\mu$m, preferably a particle size of less than 20 $\mu$m and selected from the group which consists of lamellar silicates, laminar oxides, metal modifications, carbon modifications or mixtures thereof with a binder solution having a phosphate base. The composition is free from glass frit and, after application of the coating, the glass pane with the coating thereon is heated to a temperature of 550° to 700° C. to burn the coating into the glass.

The flake-form or platelet pigment is defined more specifically below:

(1) The term "laminated" or laminar silicates is here used to refer to mineralogical and chemical compounds in the form of silicates which have a platelet crystal shape and can relate from the common use of platelet powder particles. Typical laminar silicates are mica, talc and clay minerals.

(2) Platelet oxides and oxidic compounds within the definition of the invention are those which either have a laminar crystal construction and thus breakup into platelets upon milling, for example, gamma aluminum oxide, or those which precipitate as platelet-like powders upon manufacture, for example, platelet pigments from glass.

(3) Metal modifications as the term is used herein, include platelet-like metal pigments with particle thicknesses significantly smaller than the maximum particle diameter. There are various conventional fabric techniques for such platelet metal pigments which generally are composed of metals and are commercially available.

(4) Carbon modifications generally refer to graphite and frequently also to carbon black. The modifications mentioned herein may be the allotropic of the materials.

In a preferred embodiment of the invention, laminar silicates or carbon modifications, as defined, or mixtures thereof are used as the pigment component of the composition. The mixture with the binder solutions can be so controlled by the addition of water so that the consistency is pasty to flowable and, in any event, can be applied by silk screening.

I have found that it is advantageous to use 30 to 80 parts by weight of the platelet or flaky pigment to 20 to 50 parts by weight of the binder solutions, calculated with respect to the solids content thereof. In the composition, excluding water, 30 to 50% by weight may be constituted by flaky pigments while 20 to 55% by weight is constituted by the solids of the binder solution.

When the platelet or flaky inorganic pigment does not impart an sufficient desired coloration, because, for example, colorless pigments are used, I can include in the coating composition, other pigments which have been used heretofore in the glass and ceramic industry, for example, in an amount of up to 60 percent by weight of the solids of the composition or 60 parts by weight for 30 to 80 parts by weight of the platelet and flaky pigments.

In accordance with a preferred embodiment of the invention, mica powder forms the platelet or flaky pigment and, indeed, whenever a lustrous effect is desired, mica powder can be used. The mica flakes can be coated with a metal oxide coating. The use of mica powder to generate special color effects in coating is basically known from German Pat. Document No. DE 35 07 595, although in this system the coating composition must include a glass frit or glass-forming components.

In accordance with the invention, graphite may constitute the platelet or flaky pigment or the pigment component may be augmented with graphite. The same applies to silver platelets or pigments.

Various phosphate binder solids can be used in accordance with the invention and I can employ, for example, binder solutions which have been described in the literature for other purposes, namely, for protecting the surface of hardened glass (German patent document No. DE 21 40 528).

Preferably, in accordance with the invention, the binder solution is a 50% aqueous aluminum phosphate solution with a phosphorus/aluminum ratio, given in terms of phosphorous pentoxide and alumina of $P_2O_5/Al_2O_3$ of 3.7-5.3. It has been found to be advantageous to add the binder solution to the composition so that it make up 15 to 50 parts by weight (in terms of solids content of the solution) of the screen-applied composition.

In specific terms, 15 to 50 parts by weight of the binder solution (in terms of the solids content of the binder) can be provided for 10 to 85 parts by weight of the chip-like (flake or platelet) pigment.

When it is desired to mix coloring pigments conventionally used in the glass and ceramic industry into the composition, I preferably make use of coloring oxides or oxide pigments of a spinel or zirconate base.

All of the coating compositions in accordance with the invention can be made conductive by the incorporation into the screen-applied composition of up to 10% by weight of carbon black.

When the binder solution is an aluminum phosphate solution as described, it should have a solids content of at least 20% by weight.

Preferably, I make use of flake-form or platelet pigments which have been conventionally used in other coating applications and which are here combined with the phosphate-based binder solutions in a form which allows the composition to be applied by silk-screening techniques.

Advantageously, the burning-in of the composition can be effected in conjunction with a bending or prestress heat treatment of the glass pane.

A surprising advantage of the present invention is that the ultimate rupture strength of the composite formed by the glass pane and the burned-in coating is not reduced as has been the case for other coating techniques and, as has been described above, the coating satisfies all of the mechanical and chemical requirements for automotive vehicle windshield coatings with or without graphite or carbon black inclusions for rendering the coating conductive.

These results could not have been expected based upon current knowledge of the results which were obtained when the coatings containing glass frit or glass forming ingredients were used heretofore.

SPECIFIC EXAMPLES

EXAMPLE I

The Fabrication of Black Silk-Screened and Bendable Coatings

For Composite Safety Glass For Automotive Applications

Soluble phosphate, carbon black and fine mica pigment (particle size < 40 μm) are intensively stirred in aqueous solution and the finished solution then contains the following solids in dissolved or dispersed form:
Mica: 63% by weight
Carbon Black: 9% by weight
$P_2O_5$: 23% by weight
$Al_2O_3$: 5% by weight The water content of the coloring composition is so selected that the composition can be applied in a conventional silk-screening machine with a screening fabric having 62 threads/cm, the composition being pressed through this fabric.

The composition is applied like a conventional enamel-based decor color.

The composition is used to decorate an automobile windshield comprising two plate glass panes and forming a composite safety glass by applying a black frame of the composite by silk-screening to one of the panes. After drying of the coating, the conventional separator is provided between the two panes and the safety glass is formed with the screen printed surface turned inwardly toward the wiping surface. The pair of panes is then subjected to a conventional bending process to form the completed composite safety glass. The decorated edge is provided internally in the bonding layer. During the bending step, the composite is heated to a temperature sufficient to burn in the screen printed layer into the glass.

Example II

Formation of Electrically Conductive Decorative Coating

An aqueous color mixture is formed from a graphite solid component (grain size < 20 μm) and carbon black together with aluminum phosphate in the following proportions (in percent by weight):
graphite: 61% by weight
carbon black: 8% by weight
$P_2O_5$: 21% by weight
$Al_2O_3$: 4% by weight The composition is made-up with water with agitation to form a screen-printing flowable material which is screen-printed on flat float glass panes by a silk screening machine using a screen fabric having 49 threads per centimeter.

The glass panes provided with the coating are burned-in for 4 minutes at 630° C. in a laboratory furnace.

The specific resistance p of the glass after burning was p=0.023 ohm.cm.

Example III

Decorative Coating with Lustrous Effect

A dye in water is mixed with mica powder, i.e. a so-called lustrous pigment, i.e. a pigment composed of laminar muscovite mica. The solids content of the composition is as follows:

Iriodin 500: 53% by weight
$P_2O_5$: 38% by weight
$Al_2O_3$: 9% by weight

After burning-in of the screen-printed composition for 4 minutes at 630° C., the color layer was found to have a metallic bronze-coloration scintillating and opalescent surface.

The mica flakes coated with metaloxide and method of making them are disclosed, for example, in U.S. Pat. No. 3,087,828, German Pat. No. DE 14 67 468, German Pat No. DE 20 09 566, German Pat No. DE 20 60 850 and German patent document No. DE-OS 35 28 256.

I claim:

1. A method of applying a coloration coating to a glass pane, comprising the steps of:
   (a) forming a screen-applicable glass-frit-free coating composition of a flowable consistency from at least one flake-form or platelet-form inorganic pigment selected from the group which consists of lamellar silicates, oxides, metals, carbon and mixtures thereof in a particle size less than 40 μm, and an aluminum phosphate solution binder, said aluminum phosphate solution binder being a 50% aqueous solution containing aluminum measured as $Al_2O_3$ and phosphate measured as $P_2O_5$ in a ratio $P_2O_5/Al_2O_3$ of substantially 5.3 to 3.7 and is present in said composition in an amount of 15 to 20 percent by weight in terms of solids of the solution;
   (b) screening said composition onto a glass pane to form a coating of said composition on at least a limited area of a surface of said pane; and
   (c) thereafter firing the glass pane with said coating thereon at a temperature of substantially 550° C. to 700° C. to burn said coating onto said pane.

2. The method defined in claim 1 wherein at least one glass-industry or ceramic-industry coloring pigment in addition to said flake-form or platelet-form inorganic pigment is admixed to said composition in step (a) in an amount up to 60% by weight thereof.

3. The method defined in claim 1 wherein said composition contains 10 to 85 parts by weight of said flake-form or platelet-form inorganic pigment to 15 to 50 parts by weight, in terms of solids, of a solution of said binder.

4. The method defined in claim 3 wherein said solution of said binder has a solids content of at least 20% by weight.

5. The method defined in claim 1 wherein said flake-form or platelet-form inorganic pigment is constituted at least in part by mica particles.

6. The method defined in claim 5 wherein said mica particles are metal-oxide coated.

7. The method defined in claim 1 wherein said flake-form or platelet-form inorganic pigment is constituted at least in part by graphite particles.

8. The method defined in claim 1 wherein said flake-form or platelet-form inorganic pigment is constituted at least in part by silver particles.

9. The method defined in claim 2 wherein said glass-industry or ceramic-industry coloring pigment is a spinel or zirconate coloring oxide or oxide pigment.

10. The method defined in claim 1 wherein said coating is rendered electrically conductive by incorporating carbon black into said composition in an amount up to 10% by weight thereof.

11. The method defined in claim 1 wherein said flake-form or platelet-form inorganic pigment constitutes 10 to 85% by weight of the composition and said binder solution constitutes 15 to 50% by weight thereof in terms of the solids of said solution.

12. The method defined in claim 11 wherein said binder solution contains at least 20% by weight solids.

13. A coated automotive-vehicle glass pane made by the method of claim 1.

* * * * *